(12) United States Patent
Zhao

(10) Patent No.: US 8,262,053 B1
(45) Date of Patent: Sep. 11, 2012

(54) SUPPORTING APPARATUS FOR PORTABLE ELECTRONIC DEVICE

(75) Inventor: Jiang Zhao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/213,102

(22) Filed: Aug. 19, 2011

(30) Foreign Application Priority Data

Jun. 1, 2011 (CN) .......................... 2011 1 10145773

(51) Int. Cl.
*F16M 1/00* (2006.01)
(52) U.S. Cl. ................... 248/676; 248/688; 248/292.12; 248/346.03; 248/918; 16/354
(58) Field of Classification Search ............... 248/291.1, 248/292.12, 299.1, 310, 346.03, 673, 677, 248/918, 676, 688; 16/354
See application file for complete search history.

(56) References Cited

U.S. PATENT DOCUMENTS

| | | | | |
|---|---|---|---|---|
| 3,878,964 A * | 4/1975 | Fogle | ............................ | 220/756 |
| 4,424,899 A * | 1/1984 | Rosenberg | .................... | 206/305 |
| 4,708,239 A * | 11/1987 | Bourbon | ..................... | 206/45.23 |
| 5,396,399 A * | 3/1995 | Blair et al. | ............... | 361/679.26 |
| 5,620,163 A * | 4/1997 | Wu | ................................. | 248/688 |
| 6,003,831 A * | 12/1999 | Coleman | ........................ | 248/688 |
| 6,296,217 B1 * | 10/2001 | Ikedo et al. | .............. | 248/292.12 |
| 7,490,809 B2 * | 2/2009 | Liang et al. | .................... | 248/676 |
| 7,492,581 B2 * | 2/2009 | Kuo | ........................... | 361/679.55 |
| 7,540,466 B2 * | 6/2009 | Yang | .............................. | 248/688 |
| 7,762,519 B2 * | 7/2010 | Kunii et al. | ................... | 248/688 |
| 2006/0214082 A1 * | 9/2006 | Trace | .............................. | 248/676 |
| 2007/0026297 A1 * | 2/2007 | Qin et al. | ......................... | 429/97 |
| 2009/0255092 A1 * | 10/2009 | Huang et al. | .................... | 16/405 |

* cited by examiner

*Primary Examiner* — Gwendolyn Baxter
(74) *Attorney, Agent, or Firm* — Altis Law Group, Inc.

(57) ABSTRACT

A supporting apparatus includes a U-shaped first bracket, a U-shaped second bracket pivotably attached to the first bracket through a connection mechanism, and a positioning mechanism. The connection mechanism includes a first gear mounted to the second bracket, and a second gear pivotably mounted to the first bracket and mating with the first gear. The positioning mechanism includes a positioning member slidably attached to the first bracket, a resilient member arranged between the positioning member and the first bracket, and a positioning gear pivotably attached to the first bracket and linked with the second gear. The positioning member includes a positioning pole. When the second bracket is rotated to a desired position relative to the first bracket, the resilient member biases the positioning member, such that the positioning pole engages in the positioning gear to position the second bracket.

17 Claims, 7 Drawing Sheets

SUPPORTING APPARATUS FOR PORTABLE ELECTRONIC DEVICE

BACKGROUND

1. Technical Field

The disclosure relates to an apparatus for supporting a portable electronic device.

2. Description of Related Art

Portable electronic devices, such as mobile phones and tablet personal computers, are often flat-shaped, convenient and easy to carry around. However, when a portable electronic device is horizontally set on a desk to be used, the angle of view for its screen is less desirable for the user.

BRIEF DESCRIPTION OF THE DRAWINGS

Many aspects of the present embodiments can be better understood with reference to the following drawing. The components in the drawing are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
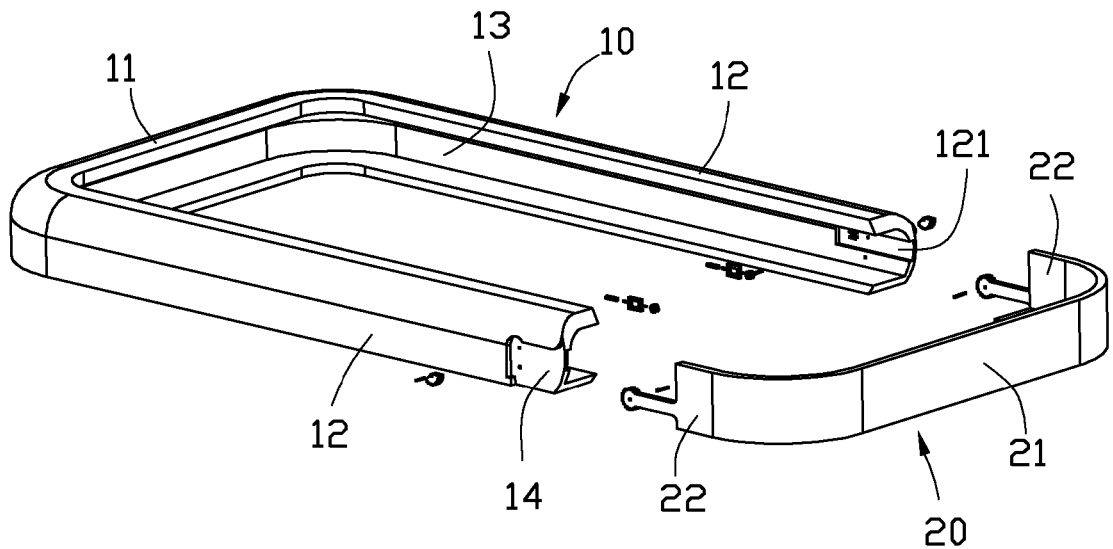
FIG. 1 is an exploded, isometric view of an embodiment of a supporting apparatus.
Figure 2:
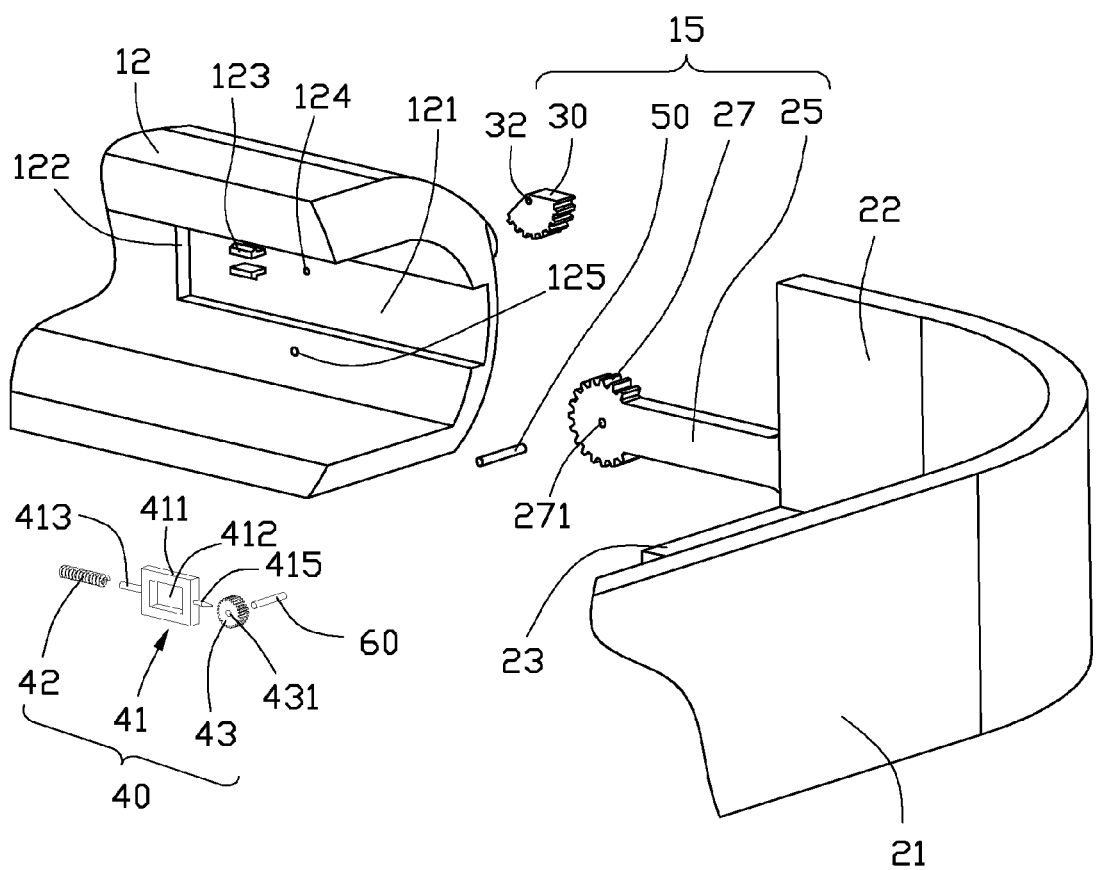
FIG. 2 is a partial, enlarged view of FIG. 1.
Figure 6:
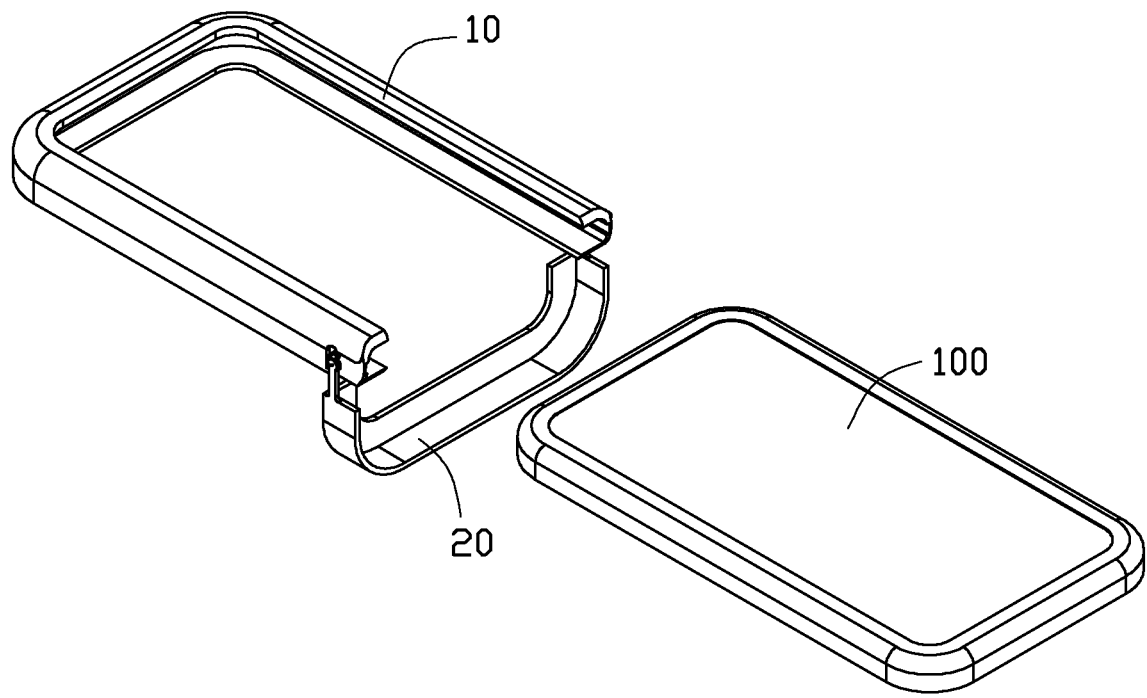
FIG. 6 is an assembled view of the supporting apparatus, together with an electronic device.

Referring to FIGS. 1-2 and FIG. 6, an exemplary embodiment of a supporting apparatus is provided for holding and supporting a portable electronic device 100, such as a mobile phone. The supporting apparatus includes a first bracket 10, a second bracket 20, two connection mechanisms 15, and two positioning mechanisms 40.

Referring to FIG. 2, the first bracket 10 is a substantially U-shaped frame, and includes an end wall 11, and two sidewalls 12 extending in a substantially perpendicular manner from opposite ends of the end wall 11. A substantially U-shaped channel 13 is defined in an inner surface of the first bracket 10, extending through the end wall 11 and the sidewalls 12. A first recess 121 is defined in an inner surface of a distal end of each sidewall 12, away from the end wall 11, in the channel 13. A second recess 14 is defined in an outer surface of the distal end of each sidewall 12, opposite to the first recess 121. An end of the first recess 121 closer to the end wall 11 forms a block surface 122. Two hooks 123 protrude on a bottom wall of the first recess 121, adjacent to the block surface 122. A first pivot hole 124 is defined in the bottom wall of the first recess 121, adjacent to a side of the hooks 123 opposite to the block surface 122. A second pivot hole 125 is defined in a bottom wall of the channel 13, below the first pivot hole 124.

The second bracket 20 is a substantially U-shaped plate, and includes an end plate 21, and two side plates 22 extending in a substantially perpendicular manner from opposite ends of the end plate 21. A substantially U-shaped flange 23 extends in a substantially perpendicular manner from bottoms of the end plate 21 and the side plates 22.

Each connection mechanism 15 includes a connecting portion 25 extending from a distal end of each side plate 22, a first gear 27, a second gear 30, and a first shaft 50. A plurality of gear teeth are formed on a circumference of the first gear 27. A through hole 271 is axially defined in the first gear. The second gear 30 is substantially fan-shaped, and a plurality of gear teeth is formed on a circumference of the gear 30. A through hole 32 is axially defined in the second gear 30.

Each positioning mechanism 40 includes a positioning member 41, a resilient member 42, a positioning gear 43, and a second shaft 60. In this embodiment, the resilient member 42 is a spring. The positioning member 41 includes a rectangular frame shaped main body 411. A rectangular hole 412 is defined in a center of the main body 411. A mounting pole 413 and a positioning pole 415 extend out from opposite ends of the main body 411. The positioning pole 415 has a tapered distal end opposite to the main body 411. A through hole 431 is defined in a center of the positioning gear 43.

Figure 3:
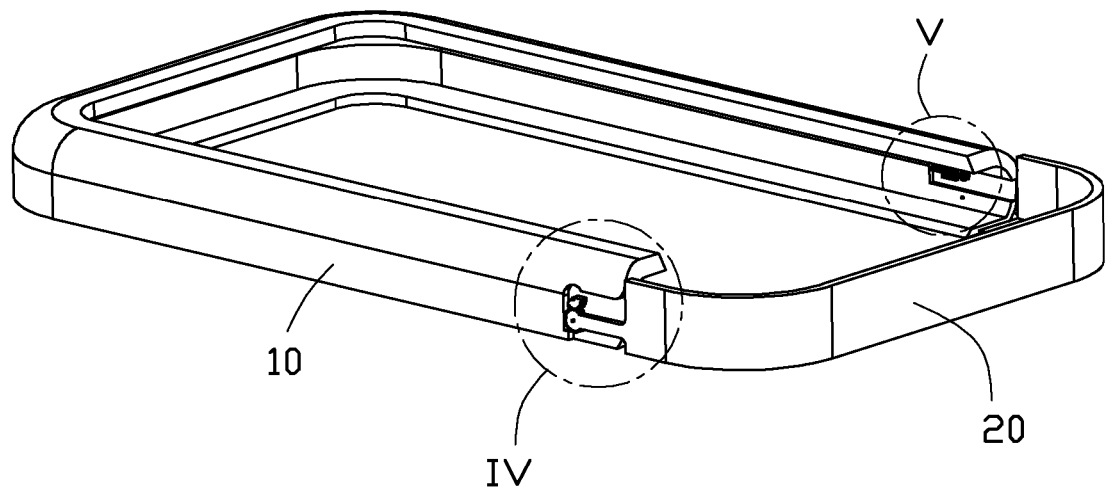
FIG. 3 is an assembled view of FIG. 1.
Figure 4:
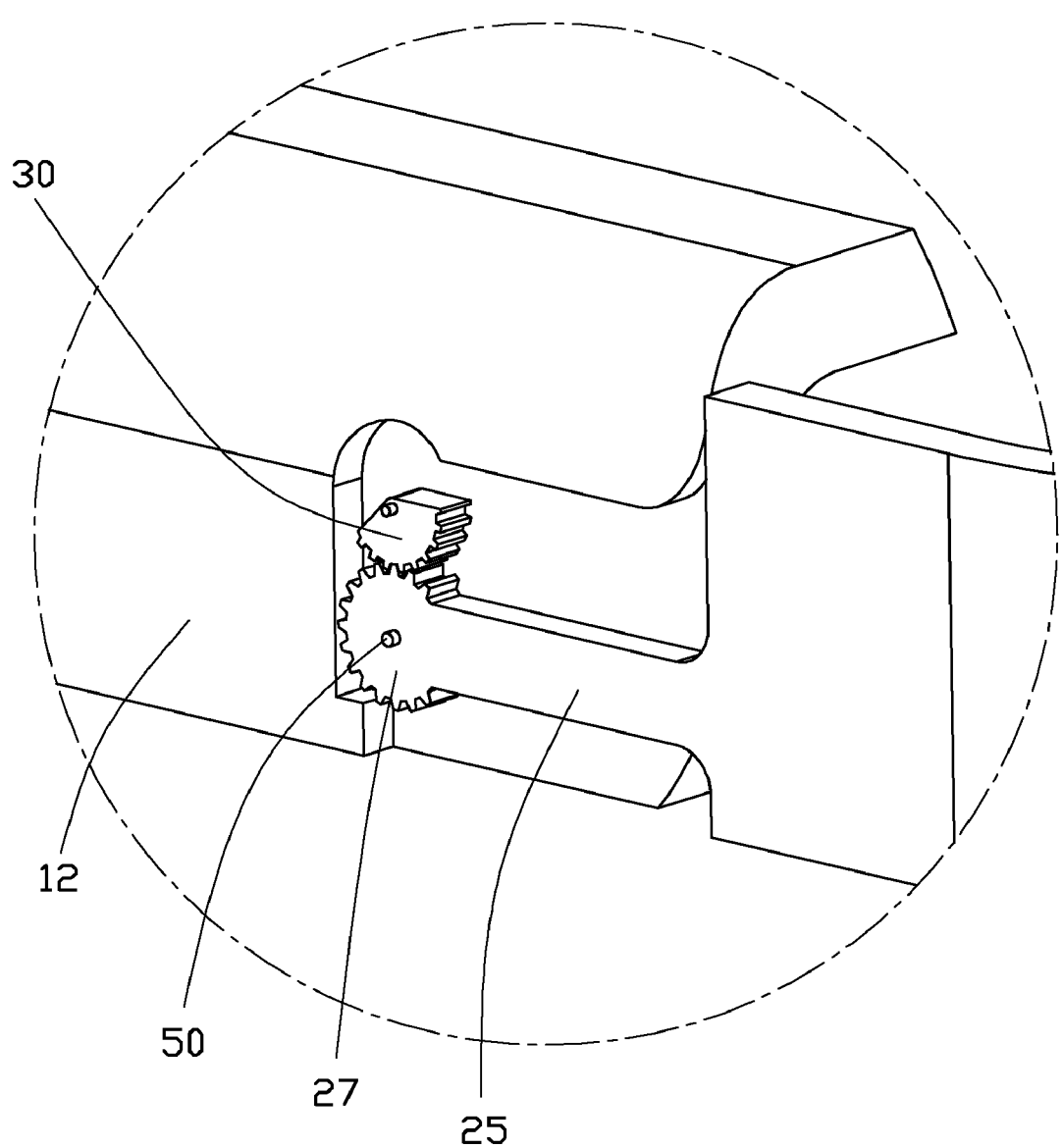
FIG. 4 is an enlarged view of a circled portion IV of FIG. 3.
Figure 5:
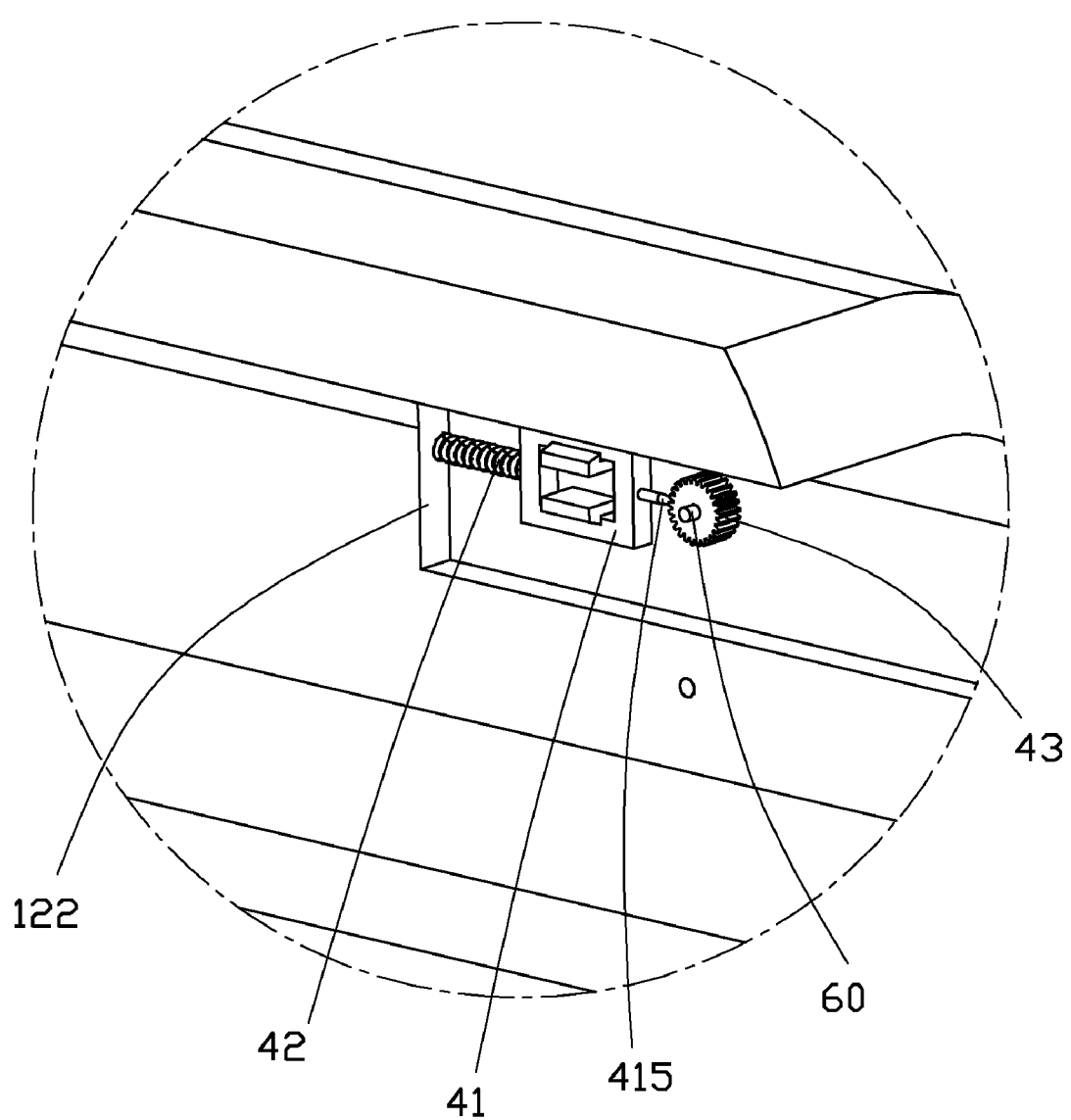
FIG. 5 is an enlarged view of a circled portion V of FIG. 3.

Referring to FIG. 3 to FIG. 5, in assembly, each first shaft 50 extends through the corresponding through hole 271 and the corresponding second pivot hole 125 to pivotably connect the first gear 27 to the second recess 14 of the corresponding sidewall 12 opposite to the channel 13. The resilient member 42 is set around the mounting pole 413 along an extending direction of the one sidewall. The hooks 123 extend through the hole 412 to movably mount the positioning member 41 to the receiving portion 121. A direction of movement of the positioning member 41 is parallel to a lengthwise direction of the sidewall 12. A first end of the resilient member 42 resists against the block surface 122, and a second end of the resilient member 42 resists against the main body 41. The second shaft 60 extends through the through hole 32 of the second gear 30, the first pivot hole 124, and the through hole 432, to pivotably attach the second gear 30 to the outer recess 14 of the sidewall 12, and pivotably attach the positioning gear 43 to the channel 13 of the sidewall 12. The positioning gear 43 and the second gear 30 are linked through the second shaft 60. The second gear 30 meshes with the first gear 27. The positioning pole 415 engages in a dent between two adjacent gear teeth of the positioning gear 43.

Figure 7:
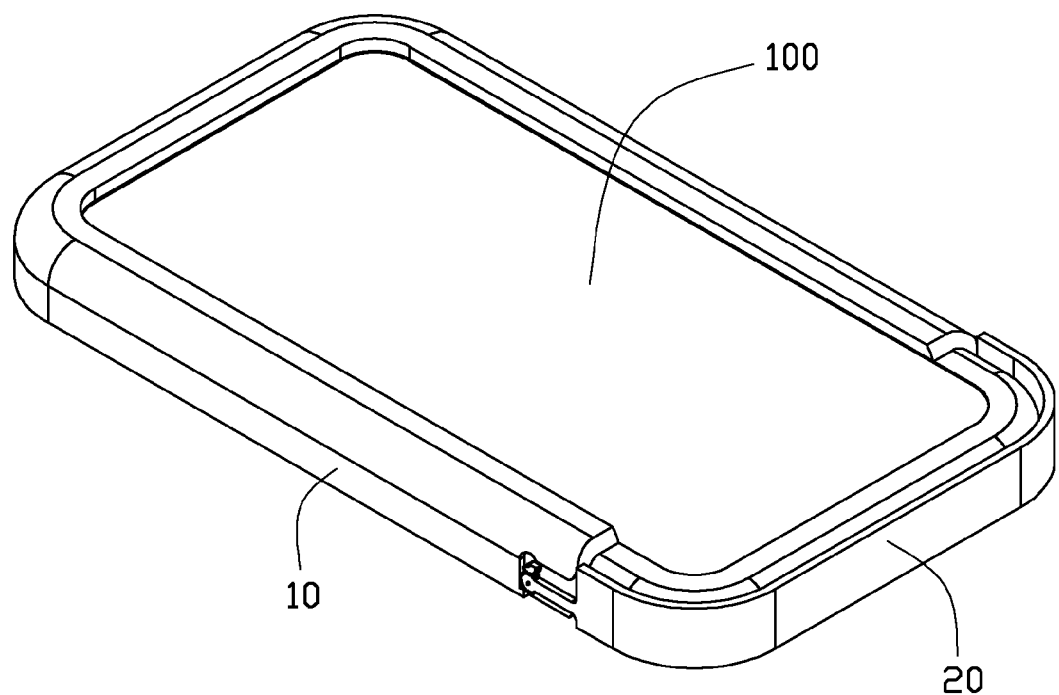
FIG. 7 is an assembled view of FIG. 6, but showing a different state of use.

Referring to FIG. 6 and FIG. 7, in use, the second bracket 20 is rotated down an angle relative to the first bracket 10 about the first shafts 50. The first gear 27 drives the second gear 30 to rotate. The positioning gear 43 rotates with the second gear 30. When the positioning gear 43 rotates to a first position where the positioning pole 415 aligns with and abuts against one of the teeth of the positioning gear 43, the positioning member 41 is pushed to move toward the block surface 122 to deform the resilient member 42. When the positioning gear 43 rotates to a second position where the positioning pole 415 aligns with the dent between two gear teeth of the positioning gear 43, the resilient member 42 is restored to move the positioning member 41 toward the positioning gear 43, thereby positioning the positioning pole 415 between the teeth of the positioning gear 43. The electronic device 100 slides into the channel 13 of the first bracket 10. The second bracket 20 is rotated back to sandwich the electronic device 100 together with the first bracket 10. The flange 23 of the second bracket 20 supports the electronic device 100. To use the electronic device 100 on a desk, the second bracket 20 is rotated down relative to the first bracket 10 about the shafts 50 to a desired angle. The end plate 21 and the end wall 11 can be supported on the desk, to keep the portable electronic device 100 angled relative to the desk.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A supporting apparatus for an electronic device, comprising:
   a first bracket comprising two opposite sidewalls;
   a second bracket comprising two opposite side plates;
   a connection mechanism comprising a first gear mounted to a first end of one of the side plates, and a second gear pivotably mounted to a first side of a first end of one of the sidewalls and meshing with the first gear; and
   a positioning mechanism comprising a positioning member slidably attached to a second side of the first end of the one of the sidewalls opposite to the first side, a resilient member connected between the positioning member and the one of the sidewalls, and a positioning gear pivotably attached to the second side of the first end of the one of the sidewalls and linked with the second gear, the positioning member comprising a positioning pole;
   wherein when the second bracket is rotated relative to the first bracket, the first gear drives the second gear to rotate, the positioning gear rotates with the second gear, when the positioning gear rotates to a first position where one of gear teeth of the positioning gear aligns with the positioning pole, the gear tooth pushes the positioning member to move away from the positioning gear with deforming the resilient member, when the positioning gear rotates to a second position where a dent between two adjacent gear teeth of the positioning gear aligns with the positioning pole, the resilient member biases the positioning member to move back toward the positioning gear, such that the positioning pole is positioned between the teeth to position the second bracket.

2. The supporting apparatus of claim 1, wherein the positioning member comprises a frame shaped main body, the main body defines a hole in a center, two hooks protrude on the one of the sidewalls and slidably extend through the hole of the main body.

3. The supporting apparatus of claim 2, wherein a mounting pole extends from a first end of the main body, the resilient member is set around the mounting pole, a first end of the resilient member resists against the first bracket, and a second end of the resilient member resists against the main body.

4. The supporting apparatus of claim 3, wherein the positioning pole extends from a second end of the main body opposite to the first end.

5. The supporting apparatus of claim 1, wherein the first bracket is a substantially U-shaped frame, a channel is defined in an inner side of the frame to receive corresponding sides of the electronic device.

6. The supporting apparatus of claim 1, wherein the second bracket is a substantially U-shaped frame, a flange extends from a bottom of the second bracket to support corresponding sides of the electronic device.

7. The supporting apparatus of claim 1, wherein the positioning pole has a tapered distal end.

8. The supporting apparatus of claim 1, wherein a first recess is defined in a second side of the first end of the one of the sidewalls, the positioning mechanism is arranged in the first recess.

9. The supporting apparatus of claim 8, wherein a second recess is defined in a first side of a first end of one of the sidewalls and opposite to the first recess, the second gear is arranged in the second recess.

10. A supporting apparatus for an electronic device, comprising:
    a first bracket comprising an end wall, and two opposite sidewalls extending from opposite ends of the end wall, wherein a channel is defined in an inner side of the first bracket and extends through the end wall and the sidewalls; a second bracket comprising an end plate, and two opposite side plates extending from opposite ends of the end plate;
    two connection mechanisms respectively and rotatably connecting the two opposite side plates to two ends of the two sidewalls; each of the two connection mechanism comprising a first gear mounted to one of the side plates of the second bracket, and a second gear pivotably mounted to a first side of a corresponding one of the ends of the sidewalls and meshing with the first gear; and
    two positioning mechanisms respectively mounted to the two sidewalls and connected with the two connection mechanisms; each of the two positioning mechanisms comprising a positioning member slidably attached to a second side of a corresponding one of the ends of the sidewalls, a resilient member arranged between the positioning member and the corresponding sidewall along an extending direction of the sidewall, and a positioning gear pivotably attached to the second side of the end of the sidewall and linked with the second gear, the positioning member comprising a positioning pole;
    wherein when the second bracket is rotated relative to the first bracket, each first gear drives the corresponding second gear to rotate, the corresponding positioning gear rotates with the second gear, when the positioning gear rotates to a first position where one of gear teeth of the positioning gear aligns with the positioning pole, the gear tooth pushes the positioning member to move away from the positioning gear with deforming the corresponding resilient member, when the positioning gear rotates to a second position where a dent between two adjacent gear teeth of the positioning gear aligns with the positioning pole, the resilient member biases the positioning member to move back toward the positioning gear, such that the positioning pole is positioned between the teeth to position the second bracket.

11. The supporting apparatus of claim 10, wherein the positioning member comprises a frame shaped main body, the main body defines a hole in a center, two hooks protrude on the corresponding sidewall and slidably extend through the hole of the corresponding main body.

12. The supporting apparatus of claim 11, wherein a mounting pole extends from a first end of the main body, the resilient member is set around the mounting pole, a first end of the resilient member resists against the one of the sidewalls, and a second end of the resilient member resists against the main body.

13. The supporting apparatus of claim 12, wherein the positioning pole extends from a second end of the main body away from the first end.

14. The supporting apparatus of claim 10, wherein the second bracket is a substantially U-shaped frame, a flange extends from a bottom of the second bracket to support the electronic device.

15. The supporting apparatus of claim 10, wherein each of the positioning poles has a tapered distal end.

16. The supporting apparatus of claim 10, wherein a first recess is defined in a second side of the first end of the one of the sidewalls, the positioning mechanisms are arranged in the corresponding first recess respectively.

17. The supporting apparatus of claim 16, wherein a second recess is defined in a first side of a first end of one of the sidewalls and opposite to the corresponding first recess, the second gears are arranged in the corresponding second recess respectively.

* * * * *

UNITED STATES PATENT AND TRADEMARK OFFICE
CERTIFICATE OF CORRECTION

PATENT NO. : 8,262,053 B1  
APPLICATION NO. : 13/213102  
DATED : September 11, 2012  
INVENTOR(S) : Jiang Zhao Page 1 of 1

It is certified that error appears in the above-identified patent and that said Letters Patent is hereby corrected as shown below:

On the title page, please replace Item (30) regarding "Foreign Application Priority Data" with the following:

(30) Foreign Application Priority Data

Jun. 1, 2011 (CN) ........................201110145773.5

Signed and Sealed this
Twenty-ninth Day of October, 2013

Teresa Stanek Rea
*Deputy Director of the United States Patent and Trademark Office*